US007325441B2

(12) United States Patent

Liu et al.

(10) Patent No.: US 7,325,441 B2

(45) Date of Patent: Feb. 5, 2008

(54) PERSONAL MASK TEST SYSTEM

(75) Inventors: Benjamin Y. H. Liu, North Oaks, MN (US); Daryl L. Roberts, Blaine, MN (US)

(73) Assignee: MSP Corporation, Shoreview, MN (US)

( * ) Notice: Subject to any disclaimer, the term of this patent is extended or adjusted under 35 U.S.C. 154(b) by 0 days.

(21) Appl. No.: 11/223,440

(22) Filed: Sep. 9, 2005

(65) Prior Publication Data

US 2006/0048783 A1 Mar. 9, 2006

Related U.S. Application Data

(60) Provisional application No. 60/608,197, filed on Sep. 9, 2004.

(51) Int. Cl.
*G01M 3/04* (2006.01)

(52) U.S. Cl. .......................................................... 73/40

(58) Field of Classification Search .............. 73/290 R, 73/40, 865.9; 356/37
See application file for complete search history.

(56) References Cited

U.S. PATENT DOCUMENTS

| | | | | |
|---|---|---|---|---|
| 3,694,085 | A | 9/1972 | Rich | 356/37 |
| 3,806,248 | A | 4/1974 | Sinclair | 356/37 |
| 4,449,816 | A | 5/1984 | Kohsaka et al. | 356/37 |
| 4,790,650 | A | 12/1988 | Keady | 356/37 |
| 4,950,073 | A | 8/1990 | Sommer | 356/37 |
| 5,026,155 | A | 6/1991 | Ockovic et al. | 356/37 |
| 5,118,959 | A | 6/1992 | Caldow et al. | 250/573 |
| 5,239,356 | A | 8/1993 | Hollander et al. | 356/37 |
| 5,255,555 | A * | 10/1993 | McKeique | 73/28.01 |
| 5,903,338 | A | 5/1999 | Mavliev et al. | 356/37 |
| 6,639,671 | B1 * | 10/2003 | Liu | 356/336 |
| 6,829,044 | B2 | 12/2004 | Liu | 356/37 |

* cited by examiner

*Primary Examiner*—Hezron Williams
*Assistant Examiner*—Rodney Frank
(74) *Attorney, Agent, or Firm*—Westman, Champlin & Kelly, P.A.; Z. Peter Sawicki

(57) ABSTRACT

A personal mask testing system (PMTS) is of a size of a human hand. The PMTS has several energy efficient features that permit running the PMTS from a battery source within the housing. The PMTS also includes a replaceable vapor source.

20 Claims, 16 Drawing Sheets

PERSONAL MASK TEST SYSTEM

CROSS-REFERENCE TO RELATED APPLICATION

The present application is based on and claims the benefit of U.S. provisional patent application Ser. No. 60/608,197, filed Sep. 9, 2004, the content of which is hereby incorporated by reference in its entirety.

BACKGROUND OF THE INVENTION

The present invention relates to instruments that test the effectiveness of face mask personal respiratory systems.

When a person is in an area where exposure to toxic substances in the air is a possibility, the best protection often is to wear a protective face mask. A respiratory protective face mask is usually provided with a filter cartridge containing activated charcoal or other chemical absorber to remove toxic vapors by physical adsorption and/or chemical absorption. It is also provided with a particle filter comprised of a High Efficiency Particulate Air (HEPA) filter to remove toxic substances in particulate form. Military personnel fighting in a war zone where chemical and biological agents may be present often wear such respiratory protective face masks along with protective clothing. Emergency workers such as police and fire fighters who may enter areas containing toxic substances in the air also wear such protective face masks for personal protection purposes.

Although the filter cartridges used in respiratory protective face masks are quite efficient and capable of removing more than 99.97% of the toxic substances carried by air through the cartridge, the degree of protection provided by the face mask is limited by the air that may leak through the face seal between the mask and the skin of the face. Face-seal leakage is a critical factor in determining the effectiveness of the face mask for personal respiratory protection.

Commercial devices are currently available to detect the face seal leakage. One such device is made by TSI, Inc. of Shoreview, Minn., and is sold commercially under the trade name PORTACOUNT. It is comprised of a condensation nucleus counter (CNC) to count airborne particles in the ambient air and inside the face mask. The air inside the face mask is comprised of filtered air that has passed through the face mask filter and unfiltered air leaking through the face seal. The ratio of the airborne particle concentration outside the face mask to that inside indicates the relative amount of air in the face mask that has leaked through the face seal, hence the degree of protection that the face mask can provide. A concentration ratio of 1 means that air inside the face mask is the same as unfiltered air from the outside. The face mask, therefore, is not providing any protection to the wearer. In contrast, when there is no face seal leakage, and the cartridge filter removes 99.99% of all the particles passing through the filter, the ratio would be 10,000. The method of face mask testing using an instrument, such as a CNC, is known as a quantitative fit test. The concentration ratio measured as described above by such a device is referred to as a fit factor, or protection factor. A protection factor of 10,000 indicates a high degree of protection, while a protection factor of 1 means no protection.

While the currently available commercial PORTACOUNT has proven its usefulness for determining face-seal leakage, it has some shortcomings that have made an otherwise useful device less than fully satisfactory.

The PORTACOUNT as an instrument weighs about 2½ pounds. While it is not too heavy to be carried around, it is too large to be used as a portable instrument carried on the person for personal respiratory fit testing purposes. With the PORTACOUNT, a person wearing a face mask must be tested, usually with the help of another person, before the person goes into action where toxic substances may be encountered. Thus, before going into a war zone, a soldier must don the face mask and protective clothing, and be fit-tested before going into action. Similarly, a fire fighter also must undergo such fit-test before going into action. Once the person is fit-tested and goes into action, there is no means available to the person to determine if face seal leakage has developed or if the face mask is still effective in providing protection for the individual.

SUMMARY OF THE INVENTION

The present invention provides a small, personal mask test system that is of a size such that an individual can carry the personal mask test system in a pocket of clothing. With such a small portable personal fit-testing device, the individual can test the efficacy of a seal of a face mask whenever he/she feels there is the need, thus increasing the frequency of the fit-test and the effectiveness of the face mask.

The personal mask testing device includes a housing of a size of a human hand and a condensation nucleus counter positioned within the housing. The housing is made of a material that provides electromagnetic shielding to and is in thermal conductive relationship with the condensation nucleus counter.

Such a personal mask testing device also includes a liquid vapor source in fluid communication with the condensation nucleus counter. Such vapor source may be removable from the housing and replaced with another vapor source.

Additionally, the condensation nucleus counter includes a vaporizer, a condenser and an optical particle counter positioned within the housing and a sampling tube for sampling aerosol and a sampling pump in fluid communication with the sampling tube and an ejector pump in fluid communication with the vaporizer, the condenser and the optical particle counter wherein the sampling pump provides flow to the aerosol and the sampling tube and the ejector pump provides additional flow to the aerosol.

Such condensation nucleus counter may also include a thermoelectric cooler in thermal contact with the condenser and the droplet counter wherein a selected temperature difference is maintained between the condenser and the droplet counter.

DETAILED DESCRIPTION

Figure 1:
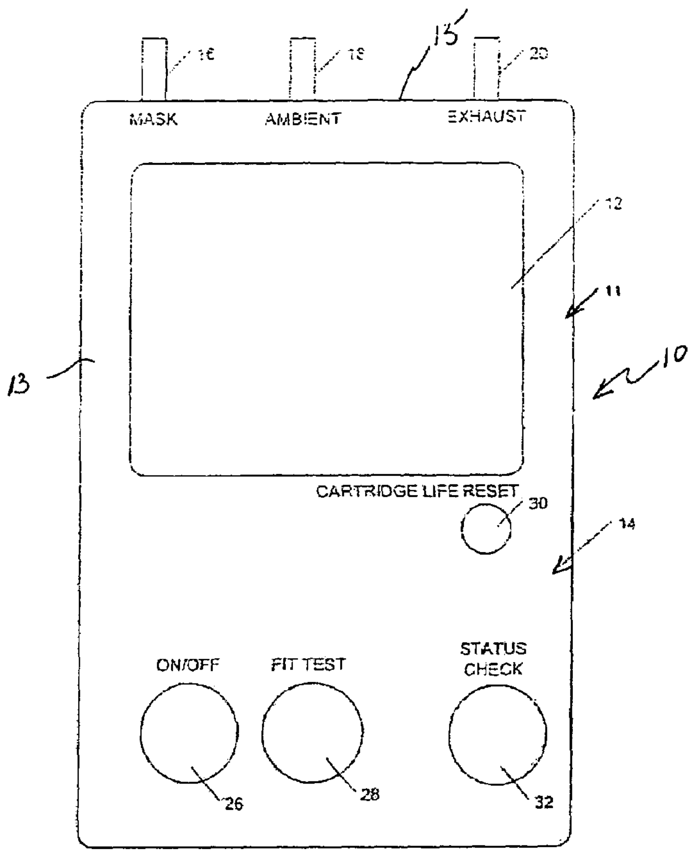
FIG. 1 is a front view of the personal mask test system of the present invention.
Figure 2:
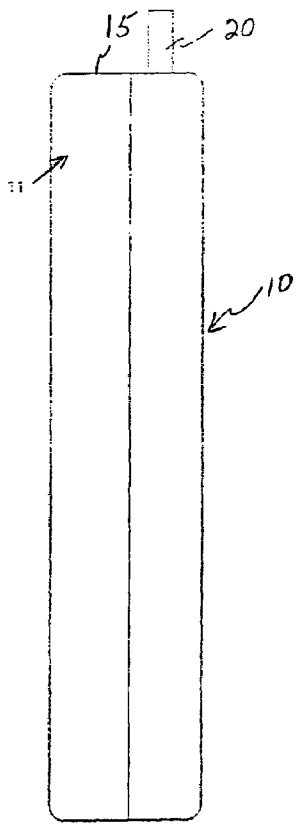
FIG. 2 is a right side view thereof.
Figure 3:
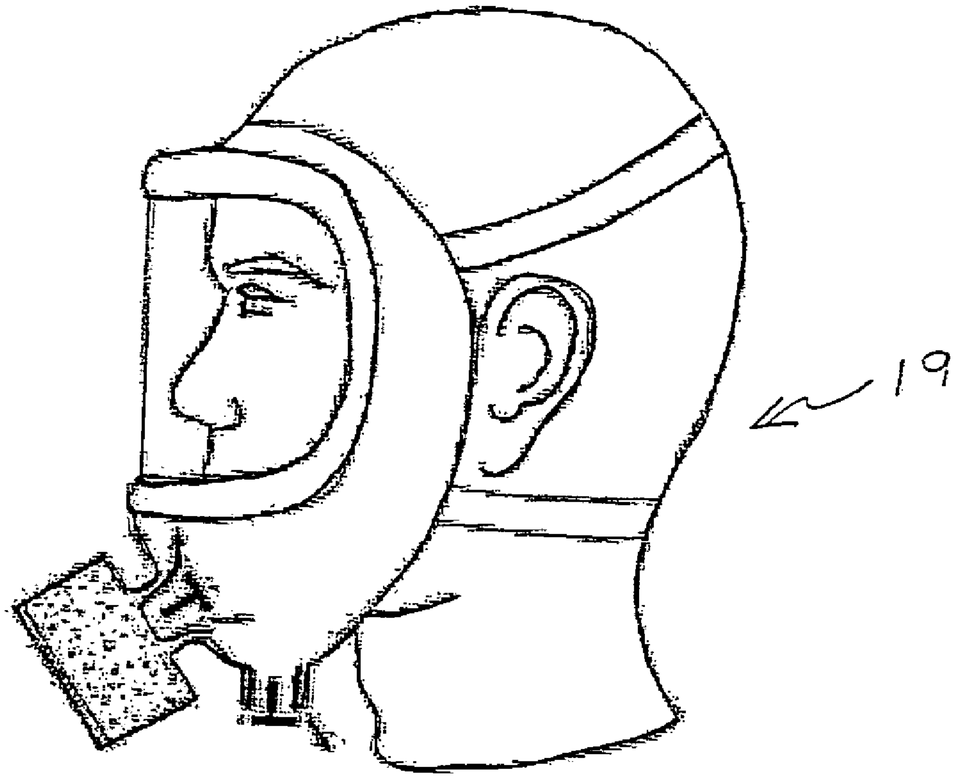
FIG. 3 is an elevational view of a face mask respiratory system.

The present invention includes a small portable personal mask test system (PMTS) generally indicated at 10 in FIGS. 1 and 2. The PMTS 10 is of a size such that the PMTS 10 can be carried by a person in a pocket of clothing for personal use to fit-test a face mask respiratory system generally indicated at 19 in FIG. 3.

The PMTS 10 includes a housing 11 having a flat-panel, electronic display such as a liquid crystal display (LCD) 12, a four-button membrane keypad 14 on a front surface 13, and a mask tube inlet 16, an ambient air inlet 18, and exhaust tube 20 on a top surface 15 of the housing 11. The mask tube inlet 16 is marked on the front surface 13 of the housing as "MASK" and the ambient tube inlet 18 is marked on the front surface of the housing as "AMBIENT" for easy recognition by the user as to which tube is to be used to measure face mask air and which is to measure ambient air. The inlets 16 and 18 are to be connected by small diameter plastic tubing (not shown) to the corresponding sampling ports on the face mask respiratory system to allow aerosol from inside and outside the mask to be sampled into the PMTS. Similarly the tube 20 is marked "EXHAUST" on the front surface 13 of the housing to indicate the exhaust to avoid blocking the exhaust.

The buttons 26, 28, 30, and 32 on the membrane keypad 14 are marked as follows:

- ON/OFF—Button 26 is pressed to turn power on or off to the PMTS
- FIT TEST—Button 28 is pressed to start a fit-test
- CARTRIDGE LIFE RESET—Button 30 is pressed to reset the cartridge life indicator after replacing an alcohol cartridge with a fresh one fully loaded with alcohol.
- STATUS CHECK—Button 32 is pressed to display the status of the PMTS 10 and various operating parameters of the instrument 10 which appear on the LCD 12.

These membrane key-pad buttons can also be replaced by buttons on a touch sensitive LCD display screen.

The PMTS 10 includes a small condensation nucleus counter (CNC) 56 used for particle detection. The CNC 56 is based on the well known principle of the continuous flow CNC in which an aerosol stream containing particles to be detected is first saturated with alcohol vapor after passing the aerosol stream through a saturator maintained at an appropriate temperature. Butyl or isopropyl alcohol is normally used because of their suitable temperature vs. vapor pressure relationship, and their relative availability and low cost. Other working fluids with appropriate physical and/or chemical properties can also be used. The saturated aerosol stream then passes through a condenser tube maintained at a temperature lower than the saturator. As the aerosol stream passes through the cold condenser tube, the aerosol stream becomes supersaturated causing vapor condensation on the particles to form droplets. The droplets are typically a few μm in diameter. The droplets are carried by the flowing aerosol stream through a laser beam such that the droplets scatter light. The light is detected by a photodiode detector and counted by appropriate electronic pulse-counting circuitry to provide a total particle count.

Figure 4:
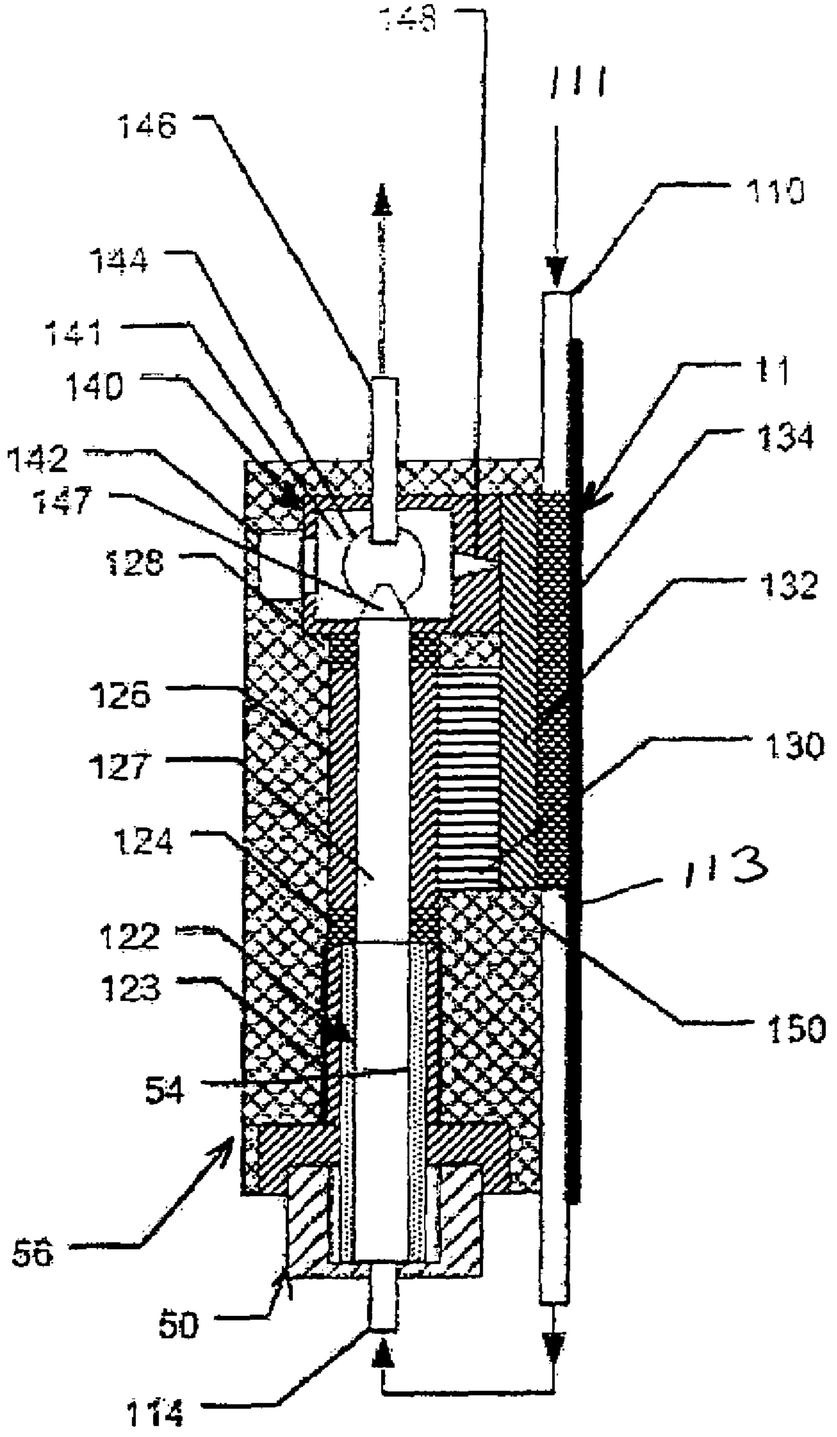
FIG. 4 is a sectional view illustrating the CNC used in the PMTS.

While the CNC 56 of the present invention is based on the same operating principles of the conventional CNC, the present invention CNC 56 as illustrated in FIG. 4 contains several innovative features that make it possible for the PMTS 10 to be of a small size and have energy conserving features as described below. In one example the PMTS is roughly the size of a human hand measuring about 4 inches by about 6 inches and it is about 1¼ inches thick.

The housing 11 provides electromagnetic shielding for the sensitive electronic components inside. The housing 11 also prevents electromagnetic radiation emitted by the electronic components in the instrument to escape to the ambient to affect other sensitive electronic equipment that may be nearby. The housing will also be thermally conductive to provide a uniform and stable temperature environment for the PMTS. The housing 11 may typically be made of stainless steel since stainless steel is thermally conductive and durable. The housing 11 can also be made of a durable plastic with a metal film coating to provide the needed electromagnetic shielding and thermally conductive properties. In normal operation, the instrument will be placed in a person's pocket. The housing 11, therefore, will be at substantially the same temperature as the interior of the pocket.

A small diameter tube 110 as illustrated in FIG. 4 carries an aerosol stream 111 to the CNC 56. A section 113 of the tube 110 is bonded thermally to the housing 11. As the aerosol stream flows through the section 113, the aerosol stream will be brought to thermal equilibrium with the housing 11, and thus at the same temperature as the housing. At the exit of tube 110, the aerosol stream is connected through small plastic tubing (not shown) to the aerosol inlet 114 of a saturator in the form of a tube 122. The inlet 114 is part of a removable inlet cap 50. The inlet cap 50 with an O-ring seal (not shown) is pressed in place to seal the metal saturator heating tube 122 at one end. The removable inlet cap 50 can be made of metal or plastic.

A replaceable saturator cartridge 54 is disposed within the tube 122. The cartridge 54 is made of a porous plastic and has alcohol stored in its interstitial pore space. The cartridge when inserted into the saturator heating tube 122 is in close thermal contact with tube 122. As the aerosol stream flows through the porous plastic saturator cartridge 54, the aerosol stream is saturated by alcohol vapor evaporating from the surface of saturator cartridge 54. The housing 11, the removable end cap 50, and the replaceable saturator cartridge 54, are all at substantially the same temperature during operation. By this means no energy is spent to heat the aerosol stream. Only the heat of vaporization of the alcohol from saturator cartridge 54 will need to be supplied. An electric heater 123 is provided for this purpose. The electric heater 123 is in close thermal contact with the saturator heating tube 122, which in turn is in thermal contact with the saturator cartridge 54

The design of the CNC in the PMTS is very different from conventional CNCs. In the conventional CNC, the saturator is usually maintained at a temperature higher than the ambient temperature. Energy must be spent to heat the aerosol stream from the ambient temperature to the operating temperature of the saturator. In addition, heat must be supplied continuously to maintain the saturator at the desired operating temperature. Examples of such designs include those described in U.S. Pat. No. 4,790,650 (Keady). In contrast, in the present invention, such energy expenditure has been eliminated, leading to reduced size for the battery pack (discussed below) and the overall size of the device.

In order for the PMTS to operate properly, saturator cartridge 54 must be kept at a sufficiently high temperature so that a sufficient amount of alcohol vapor can evaporate to saturate the aerosol stream. When butyl alcohol is used as the working fluid, a saturator cartridge temperature of 35° C. is usually used, although a lower temperature such as 30° C. or even lower can also be used.

As the aerosol stream flows out of the saturator cartridge 54, the stream will be saturated with alcohol vapor at the temperature of the saturator heating tube 122, which is in thermal equilibrium and thus at the same temperature as housing 11. The aerosol stream, now saturated with alcohol vapor, enters a tubular passageway 127 of a metal condenser block 126. The condenser block 126 is typically made of aluminum, but other metals such as stainless steel can also be used. The metal condenser block 126 has a flat side on the right that is in close thermal contact with an thermoelectric cooler 130. The other side of the thermoelectric cooler 130 is in thermal contact with a metal block 132, which is in turn in thermal contact with an optics block 140. By passing a DC electric current through the thermoelectric cooler 130, heat is extracted from the condenser block 126 causing it to cool to a temperature below that of the saturator cartridge 54. At the same time, heat rejected by the thermoelectric cooler is transmitted to the metal block 132 and in turn by conduction to the optics block 140. The optics block 140 contains components for droplet counting of the aerosol stream. As a result, the optics block 140 is heated to a temperature higher than that of saturator cartridge 54.

As the aerosol stream containing the saturated alcohol vapor enters the condenser tube 127, the stream is cooled by convective heat transfer by the cold condenser tube walls. As the aerosol stream temperature decreases, the corresponding saturation vapor pressure decreases. The alcohol vapor in the aerosol stream thus becomes supersaturated and begins to condense on the aerosol particles by the well-known principle of heterogeneous condensation. As the flow of the stream continues upward, the droplet size becomes larger. By the time the aerosol stream reaches an exit nozzle 146 in the optics block 140, the droplets have grown to a sufficiently large size to be detected by light scattering.

The optics block 140 is a metal block with an interior cavity 141. The block 140 is typically made of aluminum. However, the block 140 can also be made other suitable material such as stainless steel. Mounted on one side of the cavity 141 is a solid-state laser light source 142 with a lens (not shown) to focus the laser to a small intense beam of light. The lens can be part of the laser light source. The aerosol stream containing droplets enters the optics block 140 through an inlet nozzle 147 and exits the optics block through the exit nozzle 146. As the droplets pass through the laser beam in the cavity 141, the droplets scatter light, which is detected by a photodiode detector 144. The output of photodiode detector 144 is then amplified and counted by appropriate pulse counting circuitries. The laser beam after passing through the aerosol stream then enters a light trap 148 to prevent light reflection that would cause increased stray light in the optical cavity. More stray light in the optical cavity will lead to increased noise in the output and decrease the sensitivity of the device. Because the optics block is heated to a temperature higher than the temperature of the saturator cartridge by the waste heat from the thermoelectric cooler, vapor condensation in the optics block is avoided.

In order for the PMTS to function properly, the saturator 122, condensation block 126, and the optics block 140 must be operated within their respective temperature limits. The laser light source must produce a light beam of an adequate intensity. The pump must also operate at an appropriate speed to draw the required rate of flow through the CNC and the sampling tubes. These performance parameters can be measured and monitored to provide a warning to the user that a specific parameter is outside its normal operating range.

To make the PMTS energy efficient, all components that are at a temperature different than the housing 11 are insulated. Insulation 150 is provided for this purpose. An additional insulating gasket 124 is disposed between the saturator cartridge 54 and the condenser block 126. Another insulating gasket 128 is positioned between the condenser block 126 and the optics block 140. In addition to the above, a thin layer of insulation 134 is positioned between the aluminum block 132 and the housing 11. The thickness of the insulation 134 is such that the proper temperature differential is maintained between the housing 11 and the optics block 140.

The thickness of the insulation 134 can be determined by considering the rate of heat transfer across the insulation and the desired temperature difference ΔT to be established across the insulation. If the thermoelectric cooler pumps heat at the rate of $q_1$ from the condenser by supplying electric power, P, to the thermoelectric cooler, the heat rejected by the thermoelectric cooler to the optics block will be at the rate of $q_2$, where $$q_2 = q_1 + P$$

The rate of heat conduction across the insulation is related to the thermal conductivity, k, the area, A, and the thickness, h, of insulation 134, and the desired temperature differential ΔT to be established across the insulation, $$q_2 = \frac{kA\Delta T}{h}$$

from which required insulation thickness, h, can be readily calculated.

$$h = \frac{kA\Delta T}{q_2}$$

In the usual CNC design, the thermoelectric module is placed between the condenser and a heat sink that transfers heat to the ambient. The heat sink is usually at a temperature slightly above the ambient. In others it is used to maintain a temperature difference between the condenser and the saturator. The optics block is usually heated by a separate electric heater.

In the present invention, the thermoelectric module is placed between the condenser block and the optics block, thus eliminating the need for a separate heater for the optics block. This results in additional savings in the number of heaters needed to operate the CNC and associated electronic components needed for heater control, thereby further reducing energy use during operation.

Figure 5:
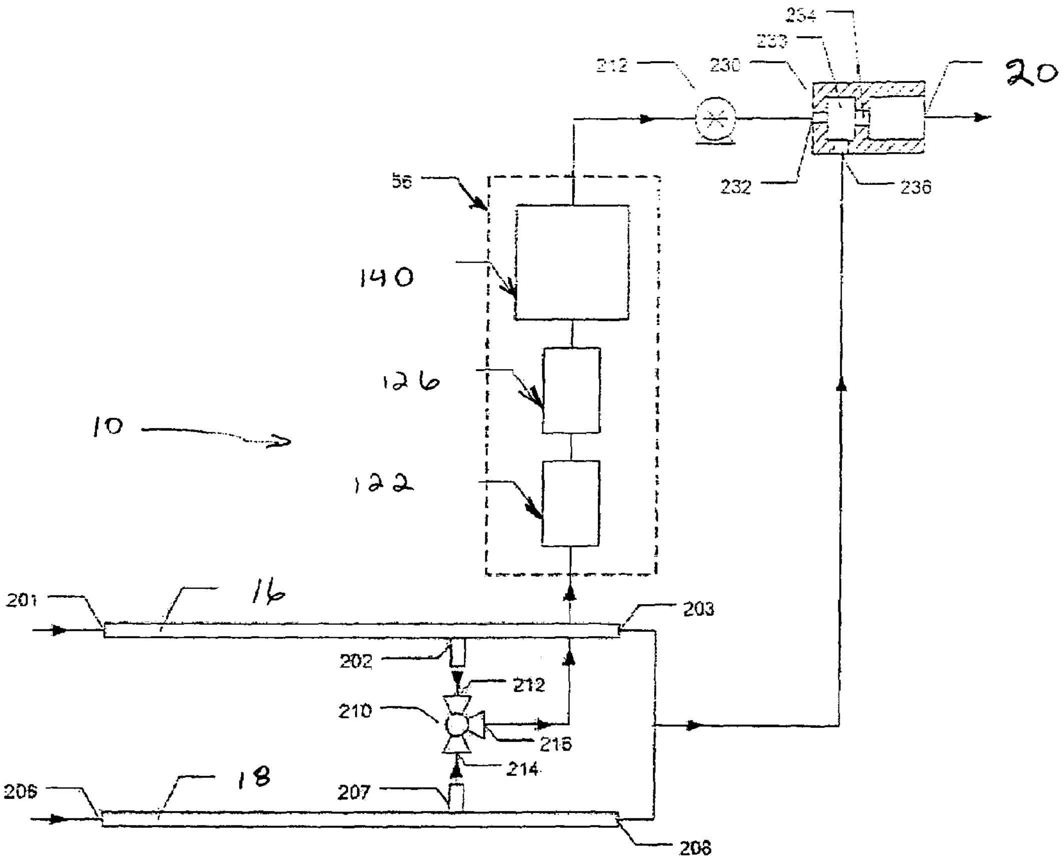
FIG. 5 is a schematic diagram of the flow within the CNC.

The PMTS 10 of the present invention is schematically illustrated in FIG. 5. Aerosol is sampled into the CNC 56 through a switching valve 210 and through one of the two sampling tubes 16 and 18. The tube 16 has an inlet 201 that is connected to the sampling port (not shown) on the face mask allowing aerosol from inside the mask to be sampled through the tube 16. The tube 16 has two outlets 202 and 203. The tube 18 has an inlet 206 that is connected to the sampling port on the mask allowing aerosol from outside the mask to be sampled through the tube 18. The tube 18 also has two outlets, 207 and 208.

The switching valve 210 has two inlets, 212 and 214 and one outlet, 216. The valve 210 has two switch positions. In one position, the valve 210 is open to allow aerosol flow to pass through from inlet 212 to outlet 216. At this position, aerosol from inside the face mask will be sampled through the tube 16. The aerosol will thus leave tube 16 at exit 202, enter valve 210 at inlet 212, exit the valve at 216 and then flow into the CNC 56. In the other position, the valve 210 is open to allow flow to pass through from inlet 214 to outlet 216. At this position, aerosol from outside the mask will flow through the tube 18, leave the tube 18 at exit 207, enter the valve 210 at 214, exit the valve 210 at 216 and then flow into the CNC 56.

The CNC 56 for detecting particles carried by the air flow is comprised of the saturator 122, the condenser block 126 and the optics block 140. A pump 212 is positioned downstream of the CNC 56 which draws flow through the CNC 56 and in turn through tubes 16 and 18. The pump 212 has an exit that is connected to the inlet of an ejector pump 230. The ejector pump 230 has a restricting orifice 232 at the inlet to accelerate the flow to a high velocity to form a jet. The jet of air then passes through a second orifice 234 of a somewhat larger size. As the high velocity air jet travels from orifice 232 to orifice 234 it entrains air from the cavity 233 between the two orifices 232 and 234. This entrained air flow causes a vacuum to be formed in cavity 233 allowing additional air to be drawn through the opening 236 on the side of the ejector pump 230.

As additional air is drawn through opening 236 by ejector pump 230, the aerosol stream flow in tubes 16 and 18 is increased. This increased air flow causes the aerosol stream to flow through the sampling tubes 16 and 18 more quickly, thus allowing particles from the sampling port on the face mask to reach the CNC down stream in a shorter time. The reduced residence time of the aerosol stream in tubes 16 and 18 allows the system to respond more quickly as the sampled flow is switched from tube 16 to tube 18 or vice versa. The reduced measurement time and the increased measurement speed also will contribute to energy savings because less energy is spent for each measurement allowing more measurements to be made for a given amount of energy stored in the battery pack. Alternatively, a smaller battery pack can be used for an instrument designed to perform a certain fixed number of measurements between battery charge or replacement.

Figure 6:
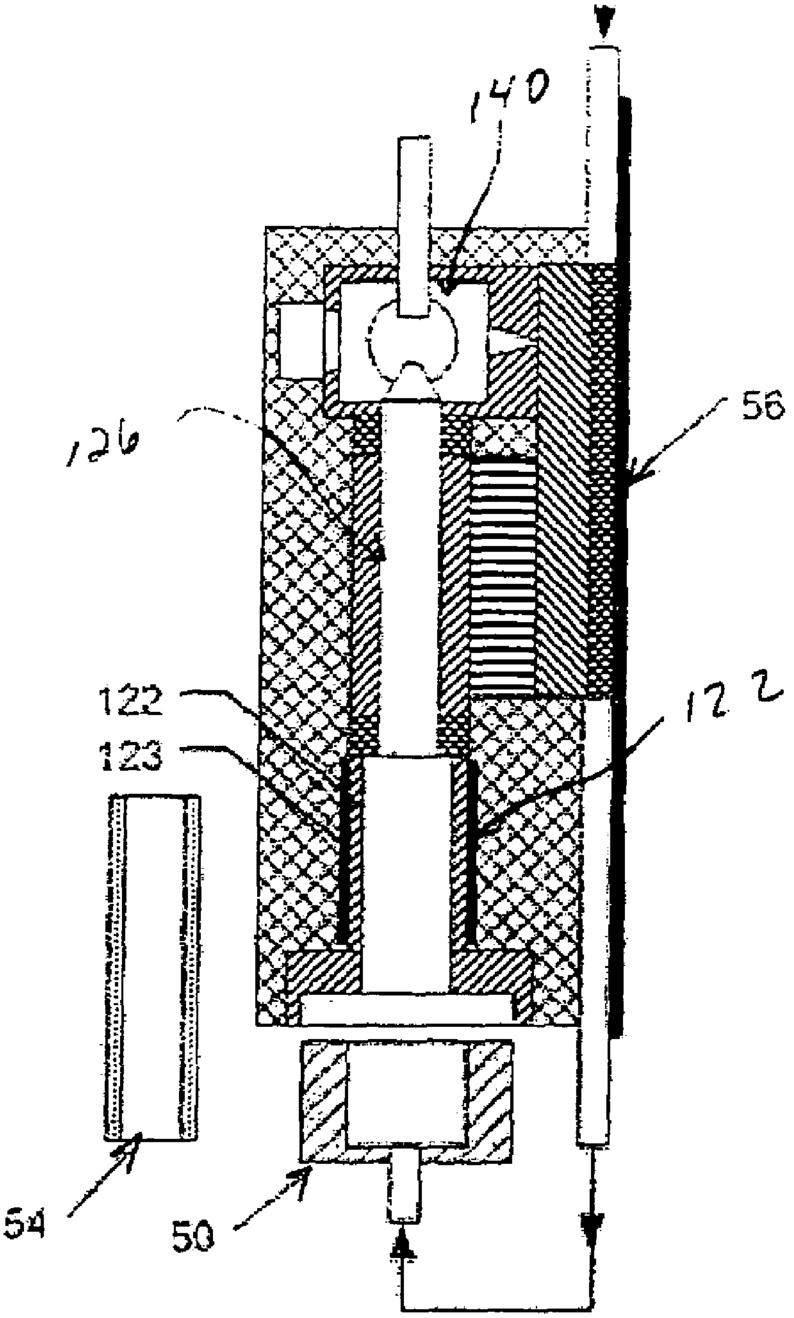
FIG. 6 is a sectional view illustrating the CNC with inlet cap removed and alcohol cartridge lying outside.

The saturator cartridge 54 is removable and replaceable by another alcohol cartridge 54 as illustrated in FIG. 6. As described previously, the cartridge 54 is in the form of a porous plastic tube carrying liquid alcohol stored in its interstitial pore space. The small replaceable alcohol cartridge is easy to insert and remove because the alcohol stored in the interstitial space of the pores will form a lubricating thin film when inserted or removed from the tube 122. The porous plastic cartridge will have a sufficiently small pore size to prevent alcohol from dripping out of the cartridge. A pore size on the order of about 10 μm will usually be sufficient, but smaller or larger pore sizes can be used without any detrimental effect.

Figure 7:
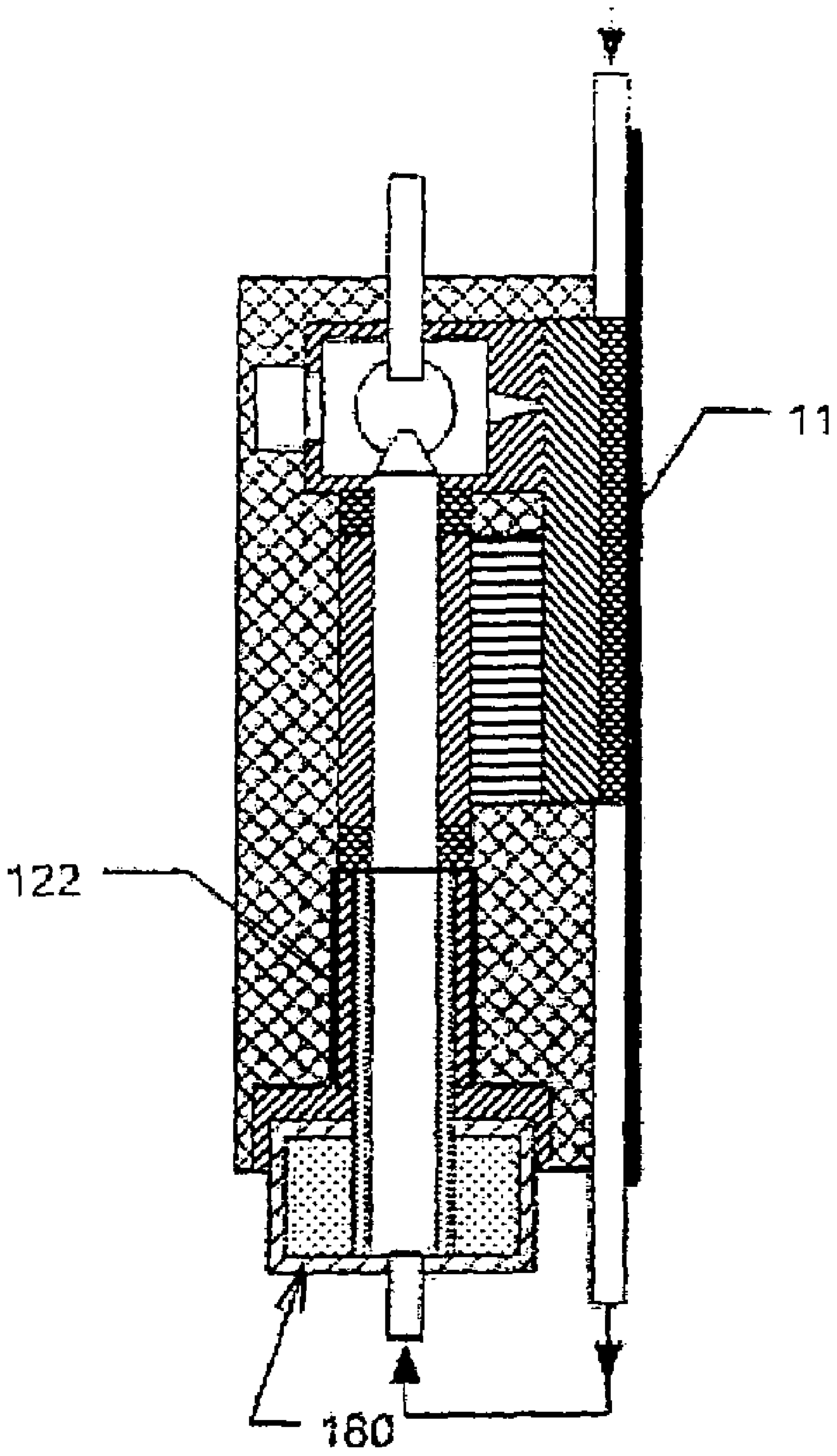
FIG. 7 is a sectional view illustrating the CNC with a large volume alcohol storage system
Figure 8:
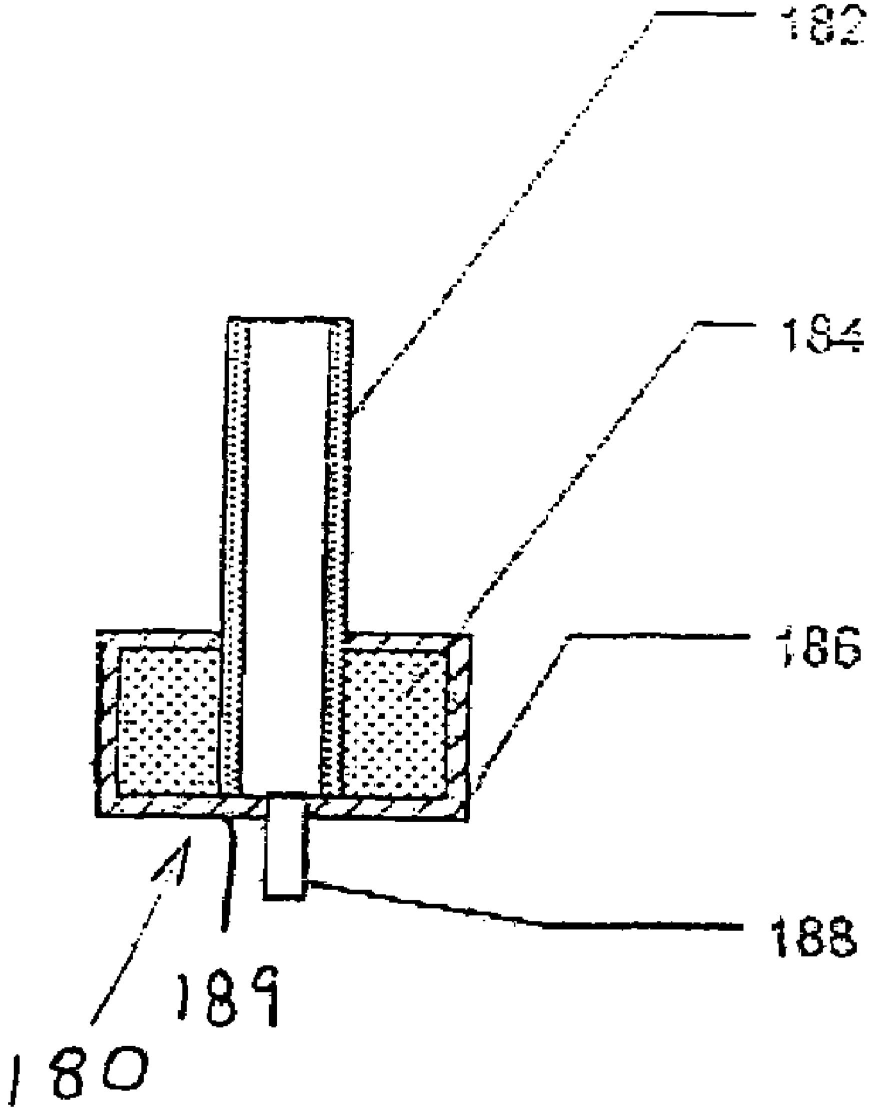
FIG. 8 is a sectional view illustrating the large volume alcohol storage system

In some cases it may be necessary to have an alcohol storage system that is larger than the space will allow in the saturator heating tube 122. FIG. 7 illustrates a large volume alcohol storage system 180 installed in the PMTS and FIG. 8 shows the large volume storage system 180 in more detail.

The system 180 is comprised of a porous plastic saturator tube 182 that can be inserted into the tubular passageway in the metal tube 122 which is at the same temperature as the housing 11. A portion of the saturator tube 182 is disposed with an outer porous plastic tube 184 that is of a substantially larger volume than the tube 182. The tube 184 has an outer case 186 made of solid plastic. The plastic case 186 has an inlet tube 188 extending from a bottom surface 189. Both porous plastic tubes 182 and 184 are filled with liquid alcohol prior to insertion into the saturator block 122. Upon insertion, the solid plastic case 186 forms a tight seal with the aluminum block 122 so that air will not leak through the interface between the solid plastic case 186 and the aluminum block 122.

When the two porous plastic tubes 182, 184 are both of the same pore size, the tube 182 may dry out completely while the larger porous tube 184 may still contain a substantial amount of stored alcohol. Although this stored alcohol can continue to evaporate through the pores of the dried-out porous tube 182, the saturation efficiency of the device may be impaired and the aerosol passing through the saturator tube 182 may no longer be fully saturated with alcohol vapor. To aid the saturation efficiency situation, the tube 182 is made of a porous plastic of a smaller pore diameter than than the pore diameter of the tube 184. For instance, the porous plastic tube 184 may have an average pore diameter of about 10 μm and the tube 182 have an average pore diameter of about 2 μm. When both porous plastic tubes are made of a material that will be wet by alcohol, the alcohol will have a tendency to move from the tube with larger pores to the tube with smaller pores as the latter dries out due to alcohol evaporation from the surface. This natural movement of alcohol will occur because of the greater capillary rise of the alcohol in the smaller pores. By this means, as the alcohol evaporates from the surface of the tube 182, the liquid stored in the larger pores of the tube 184 will naturally flow into the tube 182 to fill the smaller pores until the stored alcohol in the tube 184 is completely dried out. As a result, nearly 100% of the stored alcohol in the system will be used up before the system needs to be refilled or replaced.

An optical detector is used in the CNC of the present invention to detect droplets formed by laser light scattering. The detector produces an electrical pulse in response to each droplet passing through the laser light. The pulse amplitude, i.e. the pulse height, is a function of the droplet size. The larger the droplet size, the larger is the pulse height. In the usual CNC, the individual pulses are counted to determine the number of droplets passing through the detector, hence the number of particles formed by vapor condensation. In the present invention, the pulse height is also measured and monitored. As the stored alcohol in the saturator cartridge is near exhaustion, the amount of alcohol vapor present in the aerosol stream will decrease leading to reduced droplet size, and hence reduced pulse height. By monitoring the pulse height, it is possible to detect that insufficient alcohol vapor is present and provide a warning to the user that the stored alcohol in the cartridge is nearly exhausted and needs to be replaced.

Figure 9:
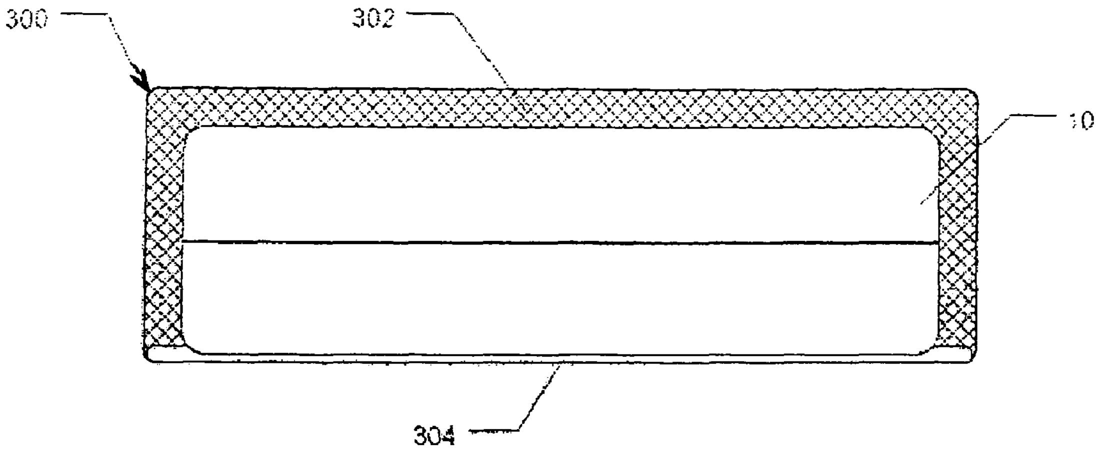
FIG. 9 is a top sectional view illustrating the PMTS in a soft, partially insulated fabric pouch

If the PMTS is to be used in an environment where the temperature can vary widely, the PMTS is provided with an outer cover or pouch 300 as illustrated in FIG. 9 which may be in the form of a soft protective fabric to help maintain the proper temperature environment for the PMTS to f unction properly. The cover or pouch 300 aids through insulation to provide a proper temperature environment. The cover or pouch 300 provides thermal insulation on all sides, except for one side 304, which is un-insulated. The un-insulated side 304 is either open or is made of a thin transparent film or layer. When placed in a pocket with the un-insulated side facing the body, the PMTS will quickly receive heat from the body, and come to thermal equilibrium at a temperature within a few degrees of the normal temperature of the human body of about 37° C. At that temperature, the instrument will operate properly, and there will be sufficient vapor pressure from the working fluid to saturate the aerosol with vapor for subsequent condensation and droplet growth. By this means a near constant temperature environment is provided for the PMTS with no additional expenditure of energy being needed for temperature control for example from a battery source.

The energy conserving features described above enables a small, pocket size device to be developed for testing face-seal leakage in respiratory protective systems. In addition, the improved performance of the CNC has made it possible to have a small compact device with higher performance characteristics than a CNC of a more conventional design.

Figure 10:
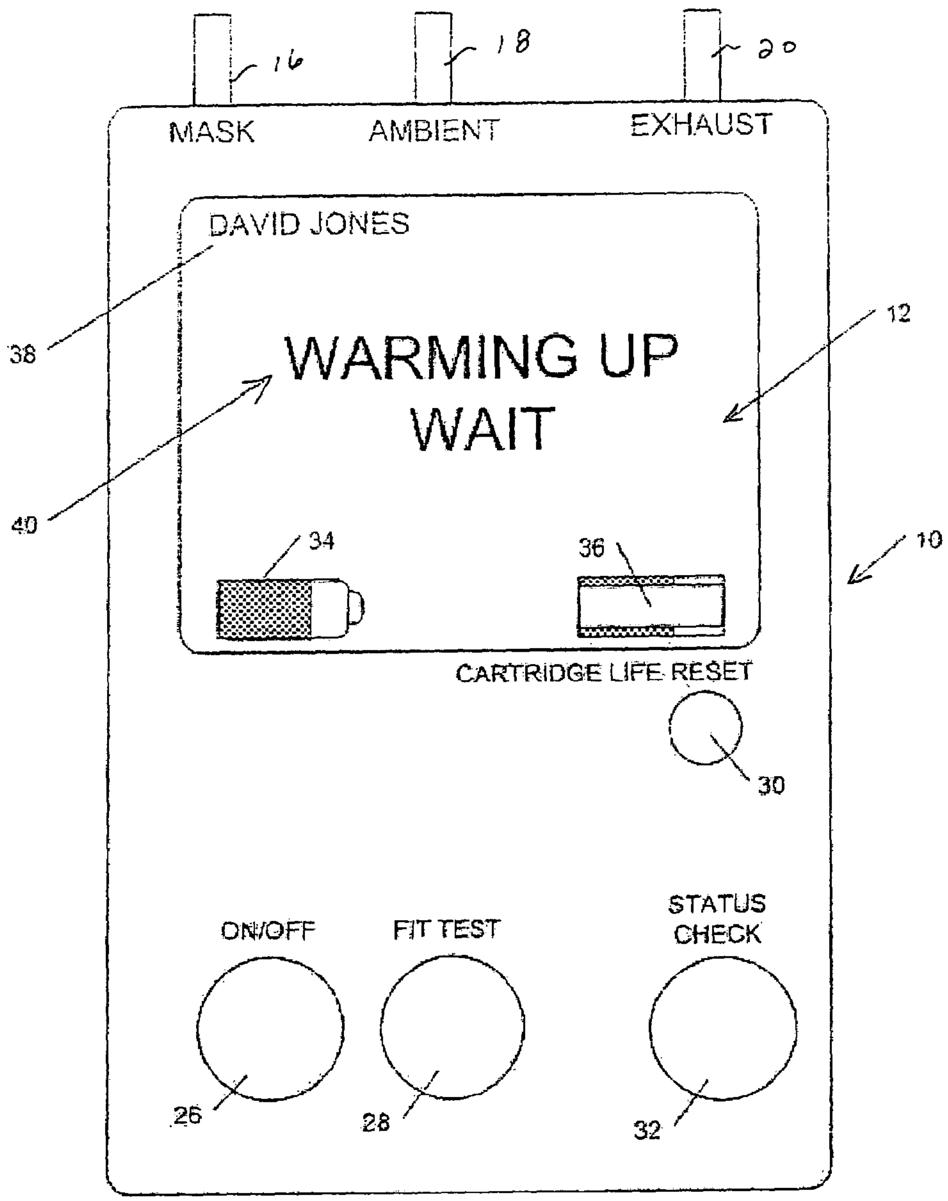
FIG. 10 is a front view illustrating the PMTS screen during warm up.

To operate the PMTS the button 26 is pressed, the LCD screen 12 will show indicia in the form of a battery life symbol 34 on the left and an alcohol cartridge life symbol 36 on the right as illustrated in FIG. 10. The symbols can be graphic symbols as illustrated, or the symbols can be small indicating lights made of small light emitting diodes (LED). For instance, six small LED lights can be used to indicate that the battery is 100%, 80%, 60%, 40%, 20% or 0% full. Similar LED lights can also be used to indicate the amount of liquid remaining in the alcohol cartridge at levels of 100%, 80%, 60%, 40%, 20% or 0%. The PMTS is also provided with necessary controls (not shown) in order for the person to enter his personal identification and other identifying information into the PMTS 10. Assuming that this has been done, and the person has entered his name, for example DAVID JONES as his personal ID, this ID will show up on the screen on the upper left corner 38. Since it will take a short period of time for the PMTS to fully warm up and be ready for a fit-test, the LCD screen 12 will show the sign 40 "WARMING UP".

Figure 11:
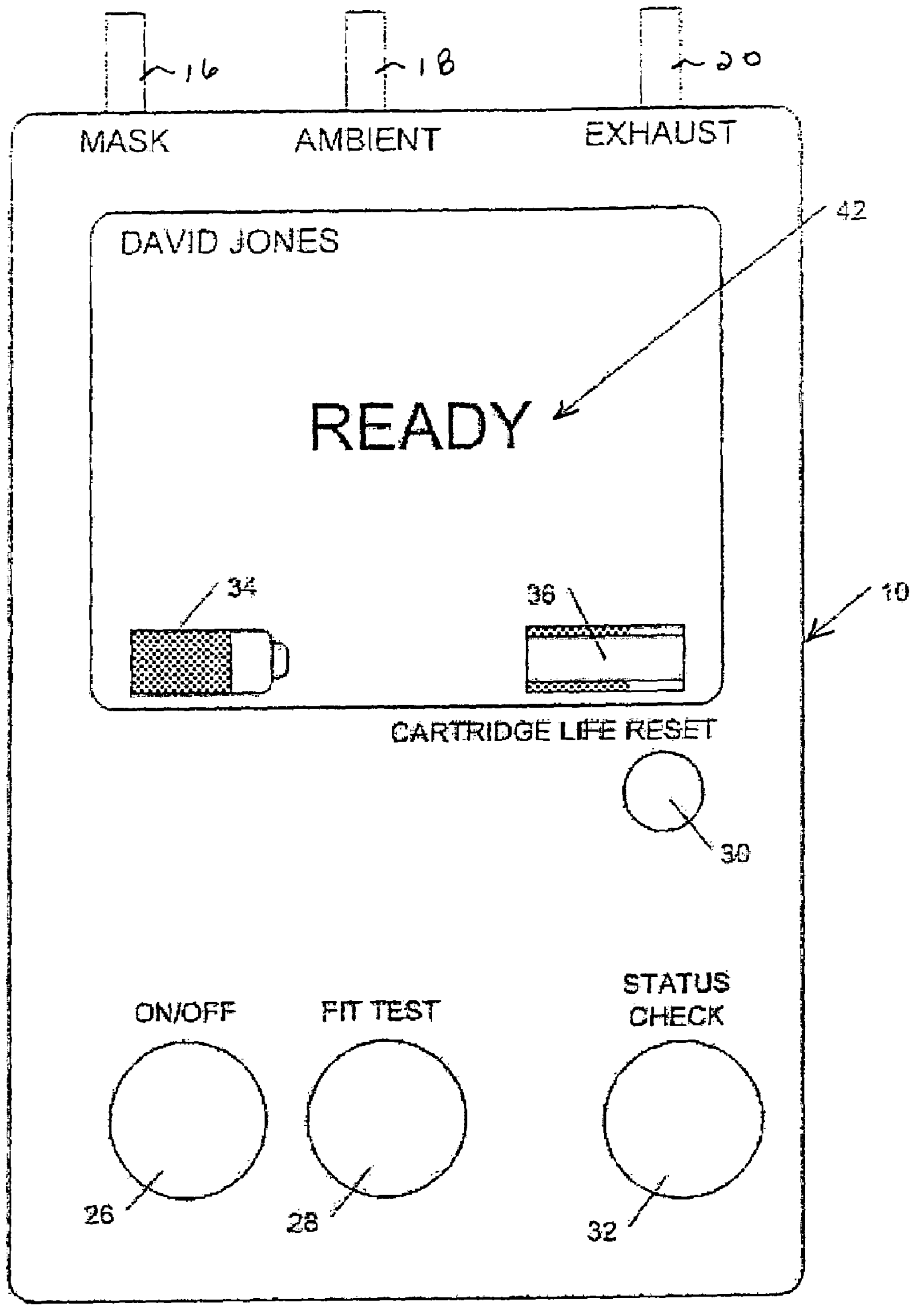
FIG. 11 is a front view illustrating the PMTS screen indicating ready status.
Figure 12:
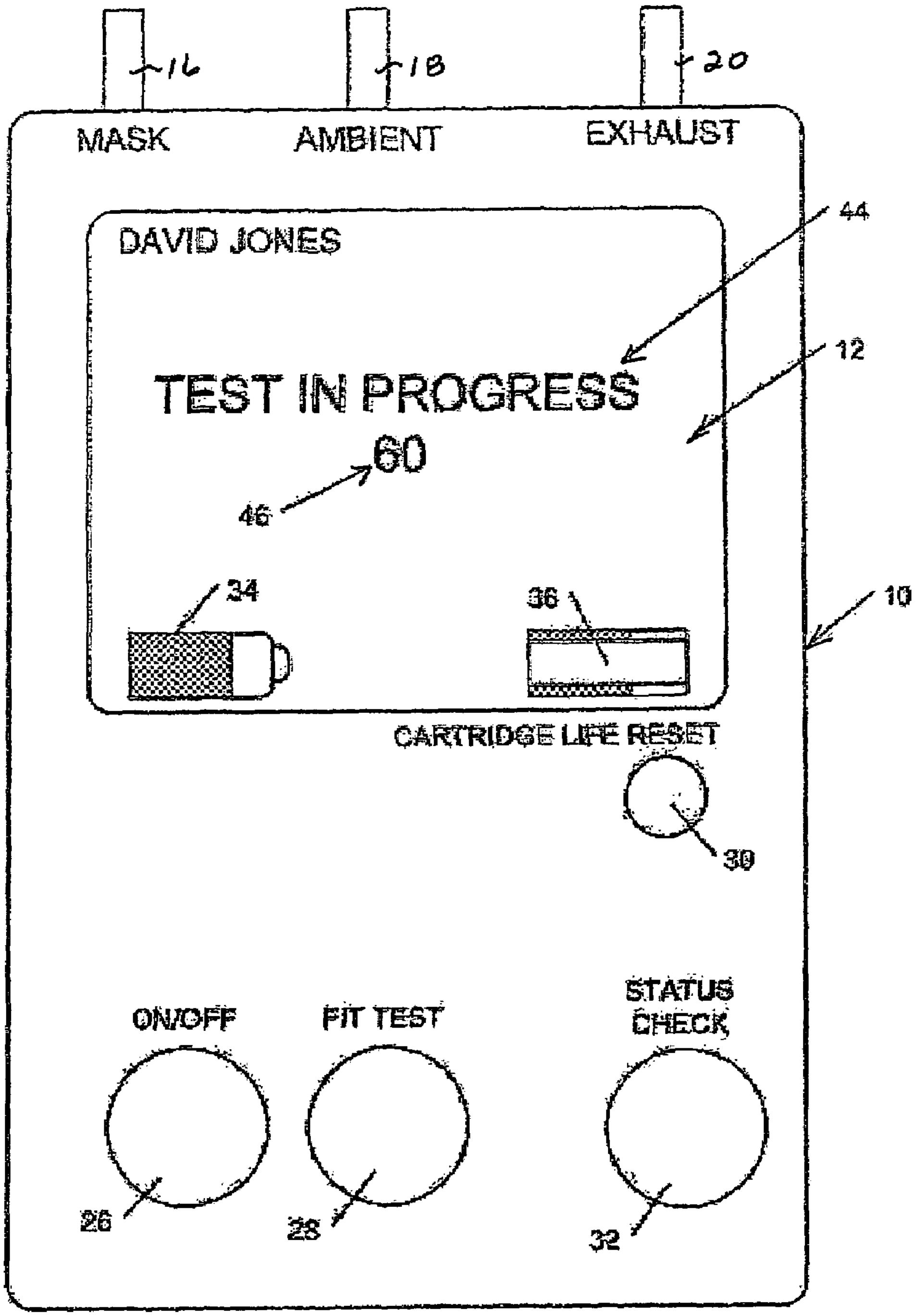
FIG. 12 is a front view illustrating the PMTS screen indicating test in progress.
Figure 13:
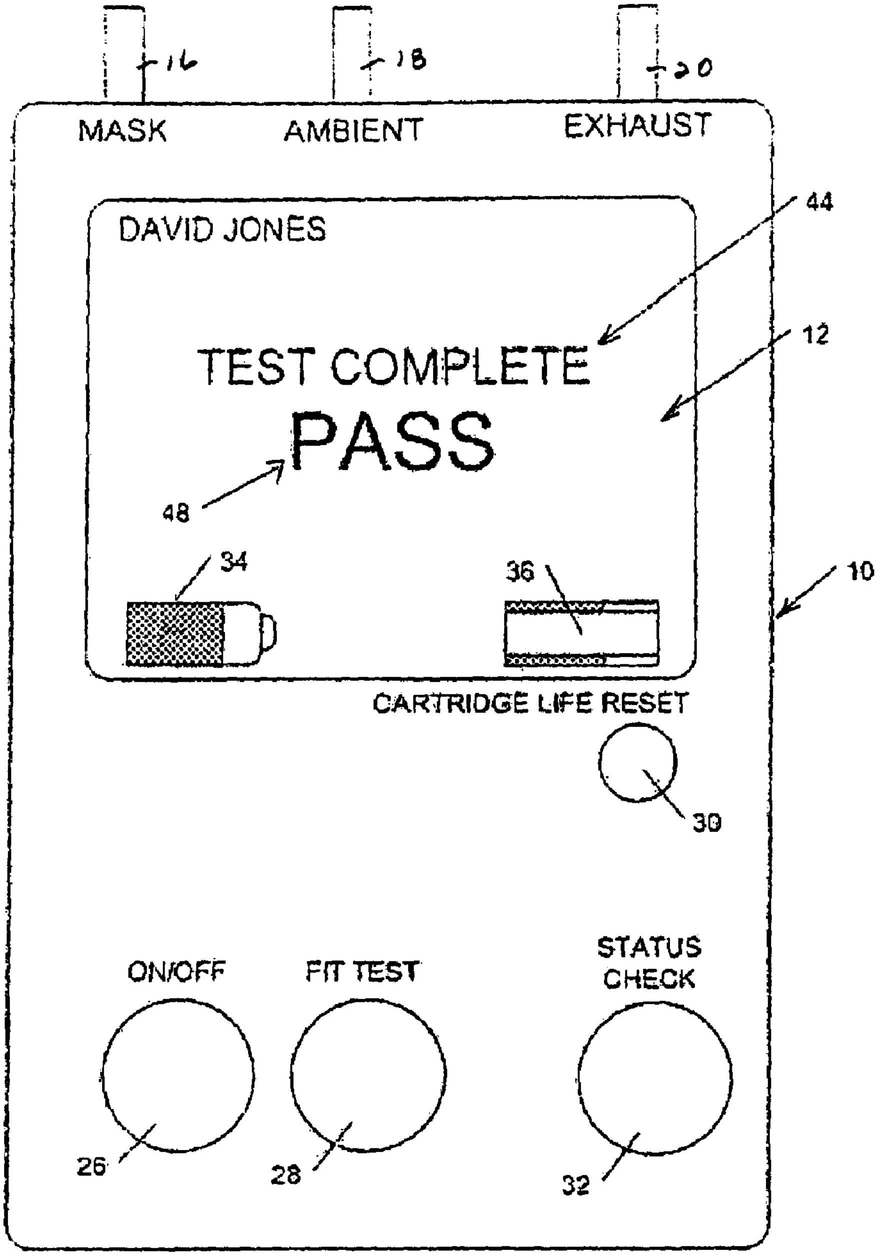
FIG. 13 is a front view illustrating the PMTS screen at an end of a test displaying a test result.

When the PMTS 10 has warmed up, the screen will display the message 42 "READY" as in illustrated in FIG. 11 to show that the device is now ready to perform a fit test, at which time the person wearing the face mask may press the FIT TEST button 28 to begin a fit test. After pressing the button 28, the screen 12 will display the message 44 "TEST IN PROGRESS" as illustrated in FIG. 12. A count-down timer 46 will appear below indicating the time remaining in the test. For instance, if the fit test takes 60 seconds to complete, the display will begin with the number 60. As each second passes, a count down timer 46 will decrement by one until the test is complete at which time the screen 12 will display the result 48 as illustrated in FIG. 13.

There may be a choice of just two test results, PASS or FAIL, or there may be three, such as PASS, LOW, and FAIL. The LOW would indicate that while the protection or fit factor measured is below what is needed to pass the test, it is sufficiently high to provide a considerable degree of protection. The individual wearing the mask will thus have a choice to proceed with more urgent matters on hand, while waiting for an appropriate time to adjust the mask or investigate the cause of the LOW fit factor, or investigate the cause of a LOW fit-test reading immediately.

Figure 14:
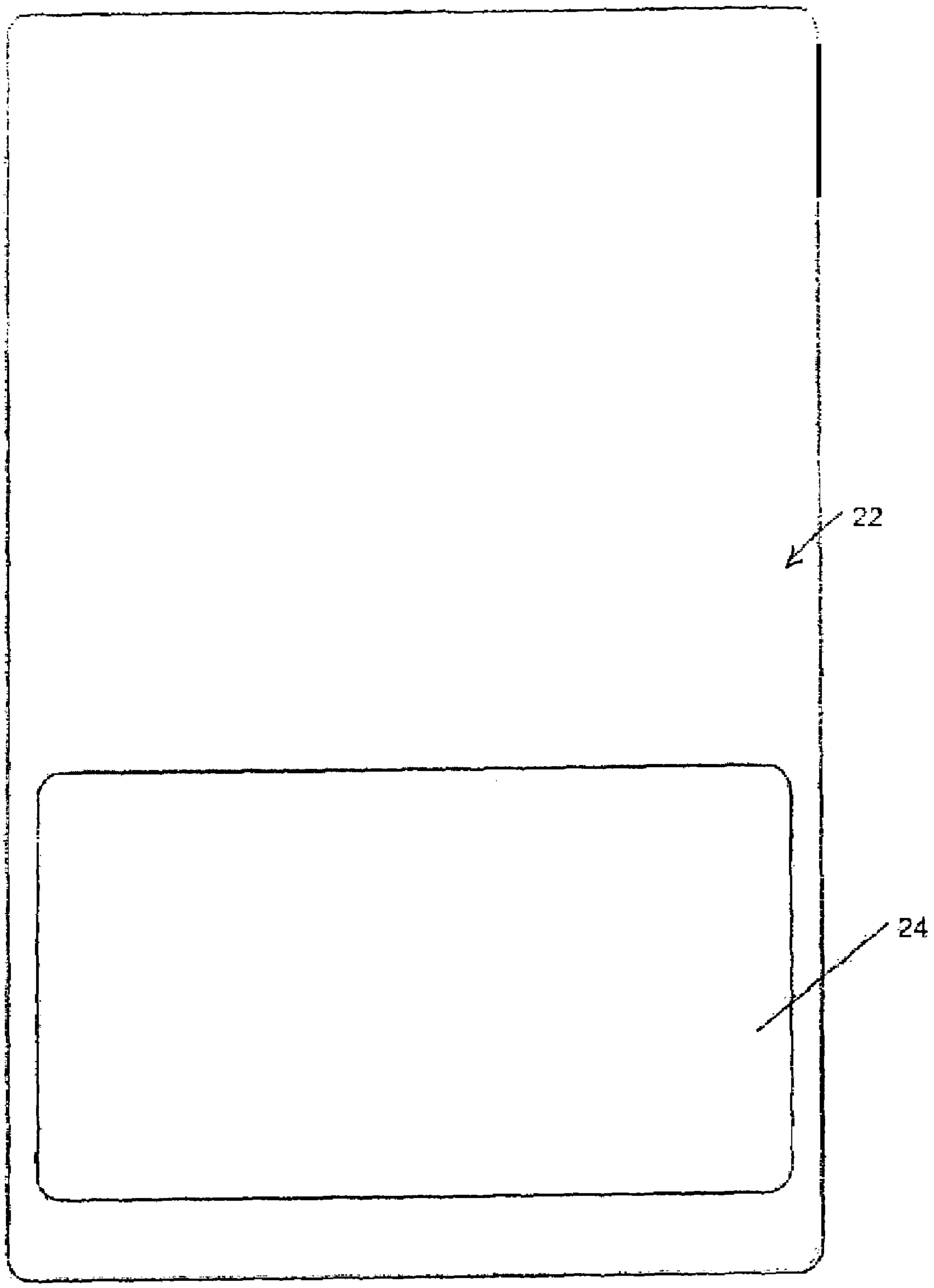
FIG. 14 is a back view of the housing of the PMTS.

The PMTS 10 is designed so that the alcohol cartridge 54 containing the working fluid in the CNC can be easily replaced in the field. A back side 22 of the PMTS 10 as illustrated in FIG. 14 includes a cover 24 that can be removed to reveal an interior compartment for holding an alcohol cartridge or batteries. As mentioned previously, the alcohol cartridge 54 is in the form of a short length of porous plastic tube soaked with alcohol. Because of capillary surface tension, the interstitial pore space is filled with liquid alcohol. This porous plastic cartridge is placed in a sealed plastic bag coated with a metal film to prevent the alcohol vapor from permeating through the plastic. If the cartridge were not placed in such a sealed plastic bag, the cartridge would lose the alcohol content during storage through vapor permeation.

Figure 15:
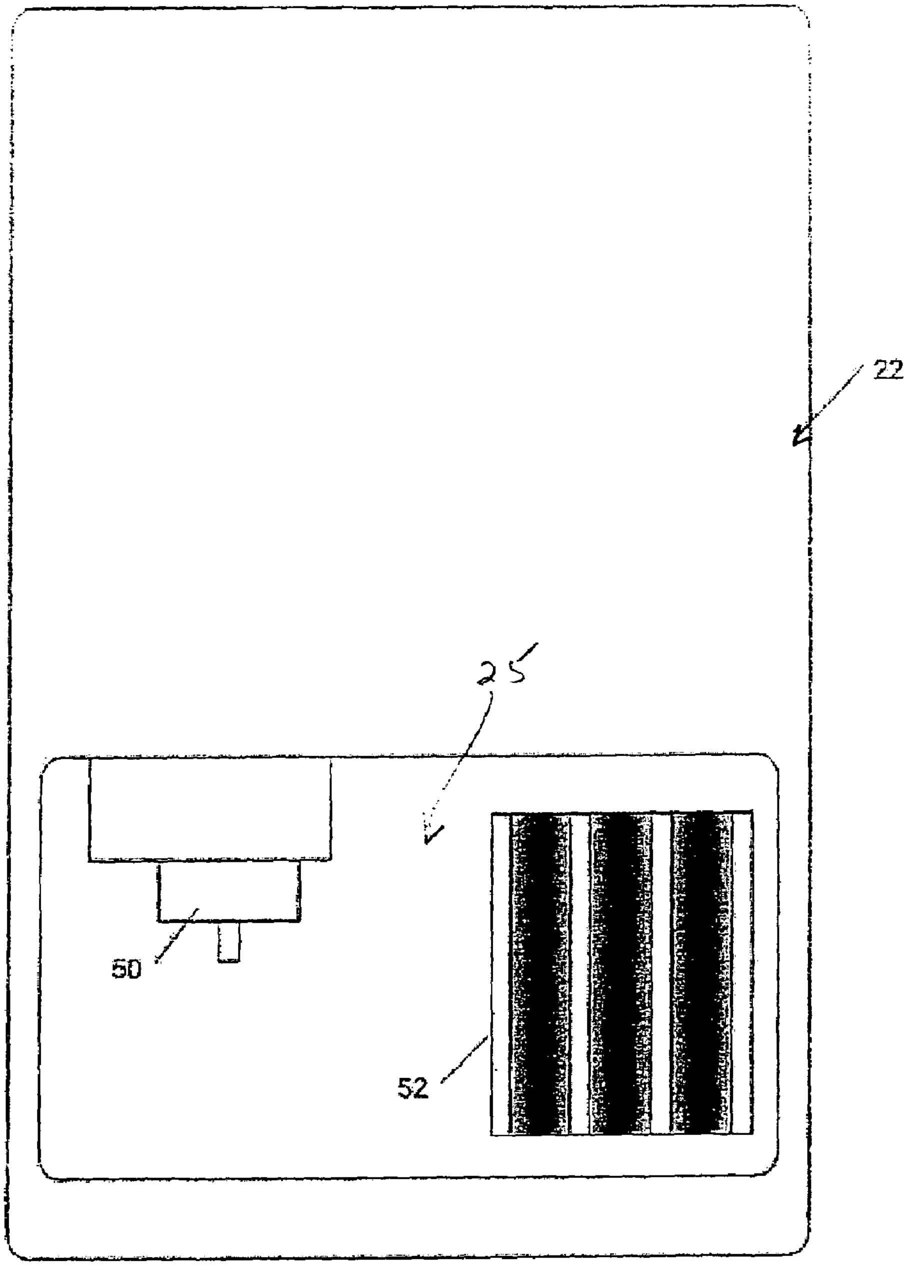
FIG. 15 is a back view of the housing of the PMTS with cover off.
Figure 16:
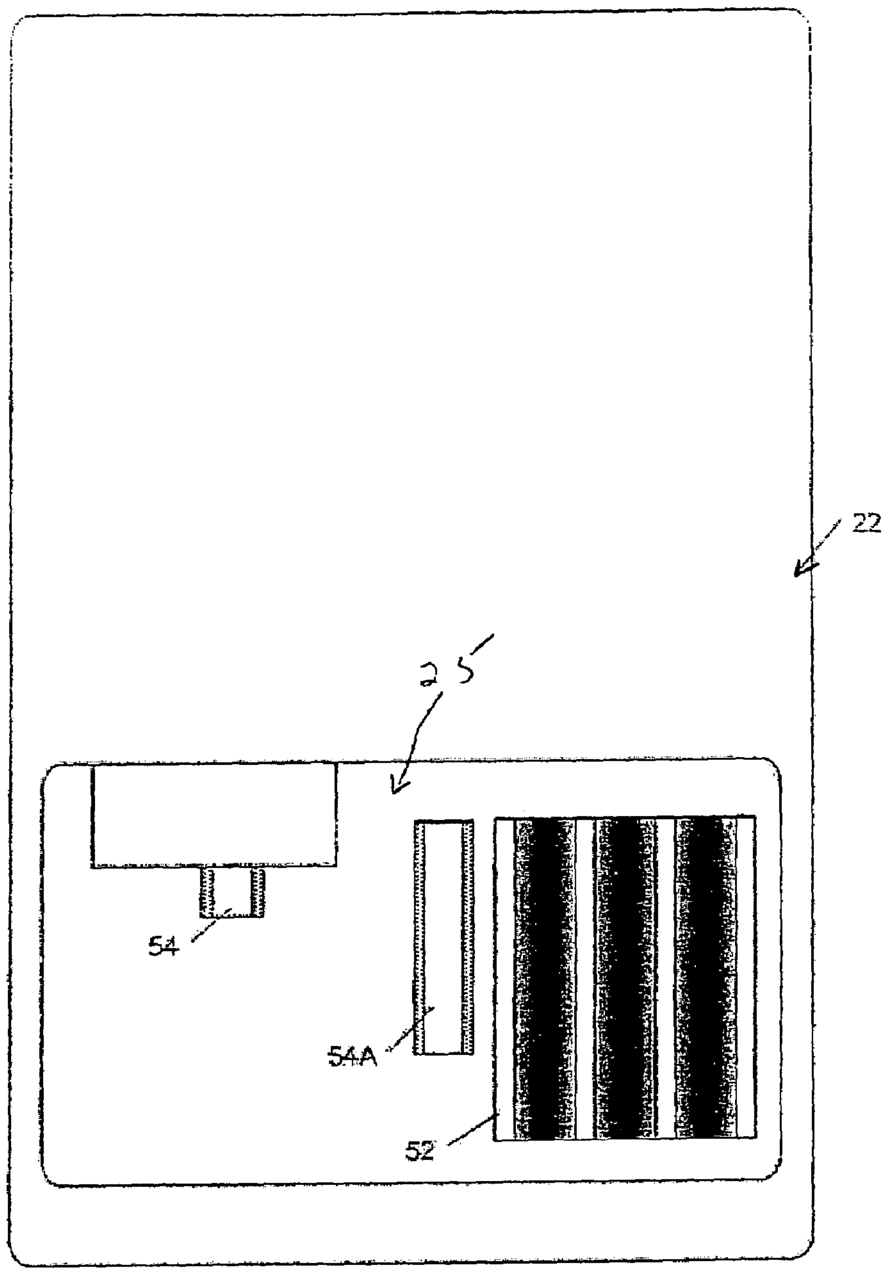
FIG. 16 is a back view of the housing of the PMTS with cover off and a fresh cartridge.

When the cover 24 on the back side of the PMTS 10 is removed, a compartment 25 is revealed containing the removable end cap 50 and a battery pack 52 as illustrated in FIG. 15. When the end cap 50 is removed as illustrated in FIG. 16, the removable alcohol cartridge 54 can then be pulled out and be replaced by a fresh cartridge 54A as illustrated next to the battery pack 52. After inserting the fresh alcohol cartridge 54A into the PMTS 10 and replacing the end cap 50, the cover 24 can be reattached. The PMTS can then be turned on by pressing the CARTRIDGE LIFE RESET button 30 to reset the cartridge life symbol on the LED display 12 to show that the cartridge is full. The PMTS 10 is now ready for use with a new alcohol cartridge 54 in place.

Figure 17:
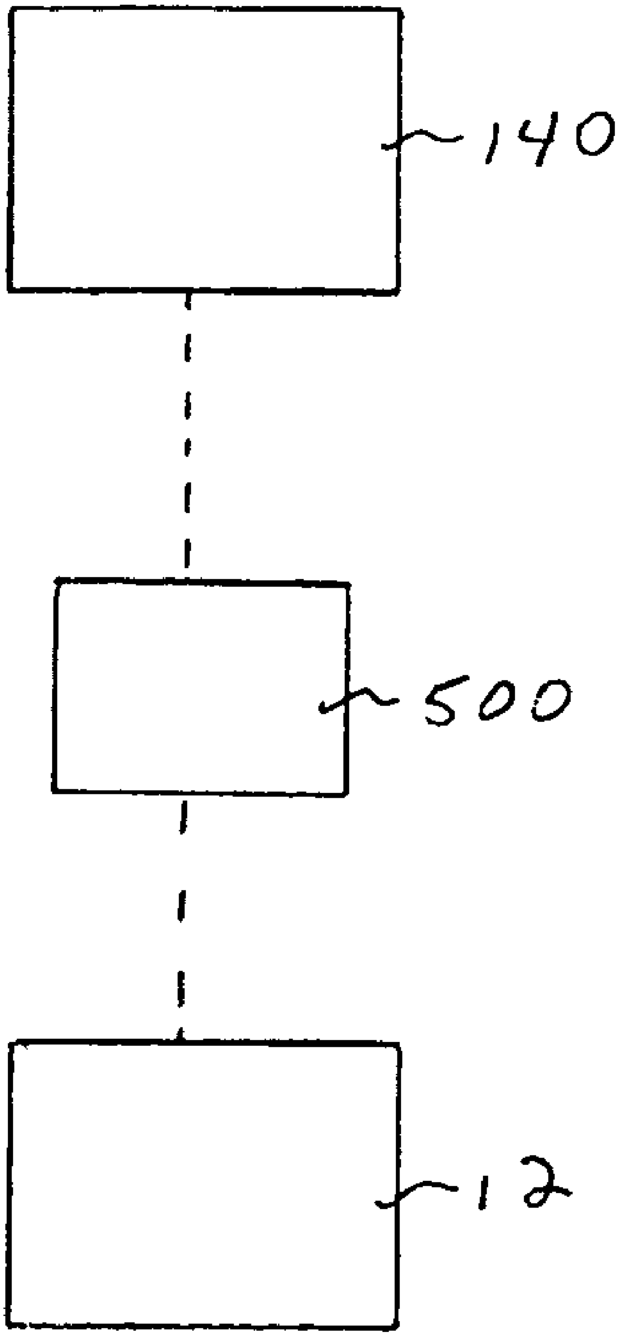
FIG. 17 is a schematic view of the mechanism to indicate the remaining fluid in the vaporizer cartridge.

The cartridge life indicator 36 will be based on the PMTS usage. The PMTS 10 will keep track of the total number of hours the instrument 10 has been used through a microprocessor 500 as illustrated in FIG. 17. Based on this usage hour and the average usage hour for the cartridge 54 to be completely exhausted, the percent unused alcohol can be calculated and displayed on the front-panel LCD screen 12. For instance, if the average of an alcohol cartridge 54 will last for 60 hours of continued use, then after the PMTS 10 has recorded 15 hours of usage, the cartridge life symbol 36 will show a cartridge that is 75% full.

The design of the CNC 56 used in the PMTS 10 that allows for such cartridge change is further illustrated in FIG. 6. The cross-sectional view illustrates the CNC 56 with the saturator 54, condenser block 126, and the optical block 140 for counting the droplets formed by vapor condensation on the particles. The porous plastic cartridge 54 carrying the alcohol liquid in its interstitial pore space can be inserted into the metal saturator heating tube 122 which is surrounded by the heater 123. The end cap 50 is then pushed on.

Although the present invention has been described with reference to preferred embodiments, workers skilled in the art will recognize that changes may be made in form and detail without departing from the spirit and scope of the invention.

The invention claimed is:

1. A personal mask testing device for measuring efficacy of a seal of a respiratory face mask on a person, the device comprising:

a housing of a size of a human hand;

a condensation nucleus counter positioned within the housing, and the housing including an inlet for connection with a sampling port on the respiratory mask for providing an aerosol sample to the condensation nucleus counter and the housing made of a material that provides electromagnetic shielding to and is in thermal conductive relationship with the condensation nucleus counter.

2. The personal mask testing device of claim 1 and further comprising a vapor source detachable from said condensation nucleus counter and removable from said housing.

3. The personal mask testing device of claim 2 and further including an interchangeable vapor source for replacing the vapor source detachably attached to the condensation nucleus counter.

4. The personal mask testing device of claim 2 wherein the interchangeable vapor source is in the form of a removable cartridge.

5. The personal mask testing device of claim 4 wherein the cartridge is made of a porous plastic having a vaporizable liquid.

6. The personal mask testing device of claim 5 wherein the cartridge includes a first portion having a first selected pore size and a second portion having a second selected pore size that is larger than the first selected pore size.

7. The personal mask testing device of claim 6 wherein the second portion is larger in volume than the first portion.

8. The personal mask testing device of claim 1 and further including a battery power source positioned within the housing for providing electrical power.

9. The personal mask testing device of claim 1 and further comprising an insulated container being insulated on all sides except one side for receiving heat from the person.

10. The personal mask testing device of claim 9 wherein the housing and pouch are of a size that fit within a pocket of clothing of the person.

11. The personal mask testing device of claim 1 wherein the condensation nucleus counter includes a vaporizer, a condenser and a particle counter and heat is supplied to the vaporizer through conduction from the person.

12. A personal mask testing device for measuring fit of a respiratory face mask on a person, the device comprising:

a housing having an inlet port for connection with the respiratory facemask to receive an aerosol sample;

a condensation nucleus counter positioned within the housing for receiving the aerosol sample;

a liquid vapor source in fluid communication with the condensation nucleus counter; and a mechanism that indicates the amount of liquid remaining in said liquid vapor source.

13. The personal mask testing device of claim 12 and further comprising a display disposed on the housing and the mechanism that indicates the amount of liquid comprising indicia in the display.

14. The personal mask testing device of claim 13 wherein the display comprising an electronic display and the indicia comprise a numerical indication on the amount of liquid remaining.

15. A condensation nucleus counter comprising:

a housing;

a vaporizer, a condenser and an optical particle counter positioned within the housing;

a sampling tube, a sampling pump and an ejector pump in fluid communication with the vaporizer, the condenser and the optical particle counter;

wherein said sampling pump providing an aerosol flow in the sampling tube, and said ejector pump providing additional flow to the aerosol in the sampling tube.

16. The condensation nucleus counter of claim 15 wherein the housing is of a size of a human hand.

17. The condensation nucleus counter of claim 15 wherein the housing is of a size and shape that fits within a pocket of human clothing and wherein the housing includes at least one surface for thermal conductive contact with a human body for transferring heat from the body to the housing.

18. A condensation nucleus counter comprising:

a condenser;

a droplet counter, and a thermoelectric cooler in thermal contact with said condenser and said droplet counter wherein the droplet counter is isolated from the condenser such that a selected temperature difference between the condenser and the droplet counter is maintained.

19. The counter of claim 18 wherein the droplet counter is an optical counter and the selected temperature difference is such that the difference prevents vapor condensation in the optical counter without the use of a separate heat source in the counter.

20. The personal mask testing device of claim 3 wherein the condensation nucleus counter includes a particle counter, and the housing includes a display thereon, and further including an electronic microprocessor for receiving size data from the optical counter and determining when such size data represents particles sizes too small for accurate measurement and providing indicia on the display as a warning.

* * * * *